UNITED STATES PATENT OFFICE.

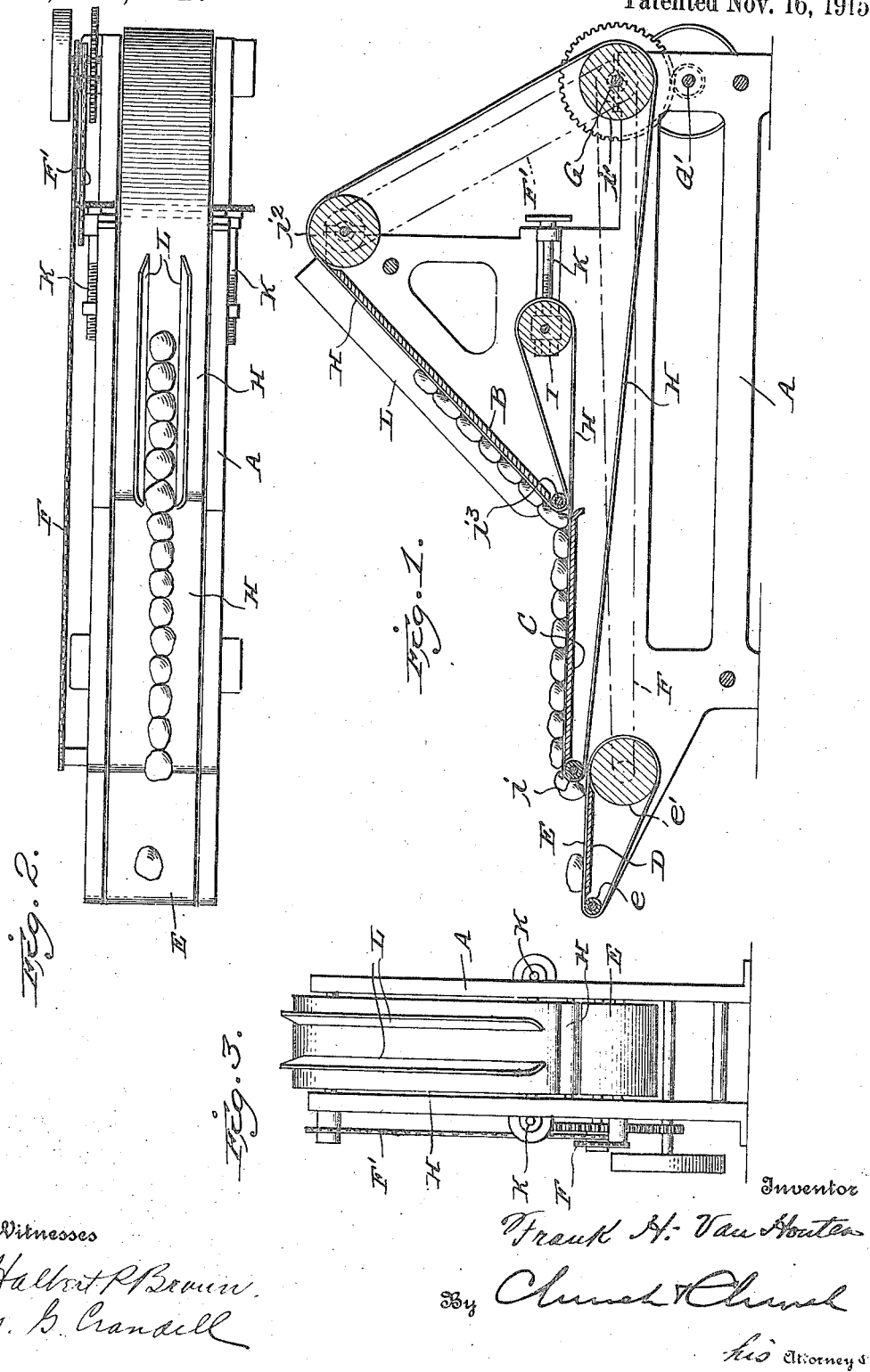

FRANK H. VAN HOUTEN, OF FISHKILL-ON-THE-HUDSON, NEW YORK, ASSIGNOR TO DUTCHESS TOOL COMPANY, OF FISHKILL-ON-THE-HUDSON, NEW YORK, A CORPORATION OF NEW YORK.

MACHINE FOR SPACING LUMPS OF DOUGH.

1,160,791.  Specification of Letters Patent.  Patented Nov. 16, 1915.

Application filed December 29, 1913. Serial No. 809,341.

*To all whom it may concern:*

Be it known that I, FRANK H. VAN HOUTEN, a citizen of the United States, residing at Fishkill-on-the-Hudson, in the county of Dutchess and State of New York, have invented certain new and useful Improvements in Machines for Spacing Lumps of Dough; and I do hereby declare the following to be a full, clear, and exact description of the same, reference being had to the accompanying drawings, forming part of this specification, and to the figures and letters of reference marked thereon.

The present invention relates to machines which are necessary for the successful and economical handling of dough in modern bakery systems, wherein the dough is handled almost completely by machinery, the object of the invention being to provide an apparatus with which lumps of dough delivered thereto irregularly may be uniformly spaced for subsequent mechanical handling. The machine, for example, may be utilized to take lumps of dough delivered from a dividing machine, a rounding up machine, or a proofing machine and which are out of space with relation to each other and deliver them with a uniform spacing for subsequent handling.

Generally speaking, the machine embodies a traveling carrier or belt which discharges the lumps of dough from the machine at a uniform speed with a traveling feeder for depositing the lumps of dough on the discharge belt, the said traveling feeder being driven at a slower speed than the discharge belt, and a mechanism for assembling the lumps of dough in an uninterrupted line on the traveling feeder. The result is that the lumps of dough being first assembled in an unbroken line, one lump immediately adjacent the next succeeding lump, and being then fed forward in this condition and deposited separately on the discharge belt, will be spaced by the latter a uniform distance apart, so that mechanical appliances may be utilized to subsequently handle the same with certainty and precision.

Referring to the accompanying drawings,—Figure 1 is a sectional elevation of a dough spacing machine embodying the present improvements; Fig. 2 is a top plan view of the same; and Fig. 3 is an end elevation looking at the discharge end, certain of the non-essential supporting mechanism being omitted in all of the views.

Like letters of reference in the several figures indicate the same parts.

The machine embodies a frame A which may be of any preferred or suitable construction adapted to rest on the floor of the bakery and to support in substantially stepped or successive relation to each other an incline B, a substantially horizontal table C below the incline, and a second substantially horizontal table D at a lower level than the table C, all of said parts being arranged in successive alinement as shown particularly in Fig. 1. The table D forms the supporting surface for a discharge belt E which belt passes around a guide pulley $e$ and a relatively large drive pulley $e'$. The drive pulley receives its motion through gearing which may conveniently be in the form of a sprocket chain indicated at F passing back to a sprocket wheel on a drive shaft G receiving its motion from a counter-shaft $G'$ driven by a belt or other suitable power connection. A traveling feeder is adapted to pass over and be supported by the table C and to deposit lumps of dough carried thereby, directly on the receiving end of the discharge belt E, and this traveling feeder conveniently takes the form of one reach of a belt H, which passes forwardly from the adjustable take-up pulley I, around a small guide pulley or roller $i$, thence back around a large pulley $i'$ on the drive shaft G, thence up over a second drive pulley $i^2$, thence down over the incline B and around a small pulley or roller $i^3$, thence back to the adjustable pulley I.

Obviously, by the employment of a single belt different reaches or portions thereof may be made to serve functions which would ordinarily be performed by separate belts in a machine of this character, but a single belt has the advantage of simplicity and of permitting of a single adjustment for taking up any stretch or elongation, as, for example, by the adjustment of the take-up pulley I, through the medium of the adjusting screw K. The reach of the belt which constitutes the traveling feeder extends over the table C, while the dough supporting surface of the incline B is formed by another reach of the belt, and both of these reaches are driven by the engagement of the pulleys $i'$ and $i^2$, respectively, the latter being driven by the shaft G through the medium of a sprocket chain or other suitable gear indicated at F'.

The drive gearing for the feeder an discharge belt are so proportioned that the discharge belt is moved at a considerably greater speed than the traveling feeder, and the rate of movement of the traveling feeder and dough supporting surface of the incline is uniform.

The object of the traveling feeder and incline is to assemble the lumps of dough in an uninterrupted line, and to progress this line of lumps into position where the lumps will be successively deposited on the discharge belt. In such operation the lumps of dough are dropped in any order desired, whether regularly or irregularly spaced on the upper portion of the incline B, and they will, due to the action of gravity, roll down said incline until arrested either by contact with a lump of dough already in position on the incline, or by the reach of the belt which forms the traveling feeder. To assist in positioning the lumps of dough lateral guides L are mounted above the incline so as to form a trough-like arrangement, the lower end of which may be converging, as shown in Fig. 2, and the width of the trough is such that the lumps of dough will be held in substantial alinement with each other.

In operation, the lumps of dough are dropped on the incline between the lateral guides at the upper end of the incline, the first piece of dough rolls to the bottom, coming to rest in contact with the feeder and horizontal table, and each successive piece of dough rolls down, one resting against the other, until there are several pieces lying on the incline. The machine is then started and the whole line of lumps is carried forward at a uniform speed. During this operation other lumps are constantly accumulating or being deposited on the incline, where they will roll down into position at the rear end of the line. As the line of lumps advances the lumps at the front end are deposited or carried by the feeder over the small pulley or roller $i$ where they contact with the discharge belt, and inasmuch as the speed of the latter is considerably greater than that of the feeder, they are at once separated from the line or the succeeding lump, carried forward and thrown off of the discharge belt. Inasmuch as the relative speeds of the belt and feeder are maintained at a certain ratio, the lumps of dough will of necessity be uniformly spaced. The incline forms as it were a reservoir which will have a sufficient capacity to permit of a very considerable irregularity in the spacing of the lumps fed to the apparatus and will take care of lumps regardless of whether they are fed fast or slowly, provided the total rate is one within the limits for which the machine is designed and run.

Having thus described my invention, what I claim as new and desire to secure by Letters Patent of the United States, is:

1. In an apparatus for uniformly spacing lumps of dough, the combination with a discharge belt driven at a uniform speed, of a traveling feeder driven at a uniform speed slower than that of the discharge belt, and positioned to deposit the lumps of dough directly on the discharge belt, means for positively feeding the lumps of dough to the traveling feeder, including an incline above the feeder and a continuously movable feed member arranged to direct the lumps of dough down said incline, and lateral guides for assembling the lumps in an unbroken row on the feeder.

2. In an apparatus for uniformly spacing lumps of dough, the combination with a discharge belt, driven at a uniform speed, and a traveling feeder driven at a uniform speed slower than that of the discharge belt, and positioned to deposit the lumps of dough directly on the discharge belt, of means for assembling the lumps in an unbroken row on the traveling feeder, embodying an incline above the feeder, and a downwardly movable dough supporting surface on said incline driven at a speed corresponding to the speed of the traveling feeder.

3. In an apparatus for uniformly spacing lumps of dough, the combination with a discharge belt, driven at a uniform speed and a traveling feeder driven at a uniform slower speed than the discharge belt and positioned to deposit the lumps of dough directly on the discharge belt, of means for assembling the lumps in an unbroken row on the traveling feeder, embodying an incline above the feeder, a downwardly traveling dough supporting surface on the incline, and drive gear for moving the dough supporting surface and traveling feeder at a uniform speed.

4. In an apparatus for uniformly spacing lumps of dough, the combination with substantially horizontal tables arranged at different levels and an incline leading upwardly from the upper table, of a discharge belt traveling over the lower table at a substantially uniform speed, a traveling feeder movable over the upper table for depositing lumps of dough on the discharge belt, a dough supporting surface on the incline formed by one reach of a traveling belt for positively feeding and assembling the lumps of dough in an unbroken line on the traveling feeder, and means for driving the feeder and dough supporting surface at a uniform speed less than that of the discharge belt.

5. In a machine for uniformly spacing lumps of dough, the combination with a discharge belt driven at a uniform speed, a traveling feeder formed by a reach of a belt extending over the discharge belt in position to deposit lumps of dough carried thereby directly on said discharge belt, an incline, a movable dough supporting surface on said incline formed by a reach of a belt traveling around the lower end of the incline in position to positively feed lumps of dough carried thereby on the traveling feeder, and means whereby the said belt reaches are driven at a uniform speed less than that of the discharge belt.

6. In a machine for uniformly spacing lumps of dough, the combination with a substantially horizontal table, an incline extending upwardly from one end of said table and lateral guides above said incline forming a trough-like structure, of a belt extending over the incline and table with a loop intermediate the incline and table, means for driving said belt, whereby lumps of dough deposited in the trough will be carried in an unbroken line over the table and a discharge belt for receiving the dough at the end of the table, and gearing for driving said discharge belt at a speed greater than the speed of movement of the first mentioned belt.

FRANK H. VAN HOUTEN.

Witnesses:
WM. T. STRIPPEL,
ANNA F. DEVEREAUX.